United States Patent
Tarrant

[11] Patent Number: 5,546,648
[45] Date of Patent: Aug. 20, 1996

[54] METHOD OF MAKING A ROTOR

[75] Inventor: Colin D. Tarrant, Flint, United Kingdom

[73] Assignee: British Nuclear Fuels plc, Cheshire, United Kingdom

[21] Appl. No.: 448,684

[22] Filed: May 24, 1995

Related U.S. Application Data

[62] Division of Ser. No. 232,268, Jul. 16, 1994, Pat. No. 5,477,092.

[30] Foreign Application Priority Data

Sep. 7, 1992 [GB] United Kingdom .................... 9218928
Jul. 6, 1993 [GB] United Kingdom .................... 9313945

[51] Int. Cl.$^6$ .................................................. H02K 15/02
[52] U.S. Cl. .................................................. 29/598; 29/608
[58] Field of Search ........................... 29/598, 596, 608; 310/156, 42, 43, 44, 45

[56] References Cited

U.S. PATENT DOCUMENTS

| | | |
|---|---|---|
| 3,488,837 | 1/1970 | Massonda ................................. 29/598 |
| 4,360,871 | 11/1982 | Blaney . |
| 4,508,567 | 4/1987 | Mizuno et al. . |
| 4,674,178 | 6/1987 | Patel ........................................... 310/43 |
| 5,285,699 | 2/1994 | Walls et al. . |
| 5,382,219 | 1/1995 | Malekmadani . |

FOREIGN PATENT DOCUMENTS

| | | |
|---|---|---|
| 2204916 | 5/1974 | France . |
| 3021396 | 12/1981 | Germany . |
| 6253161 | 6/1987 | Japan . |
| 1370655 | 10/1974 | United Kingdom . |
| 2082846 | 3/1982 | United Kingdom . |

OTHER PUBLICATIONS

Derwent Abstract; SU 708464

*Primary Examiner*—Carl E. Hall
*Attorney, Agent, or Firm*—Nixon & Vanderhye

[57] ABSTRACT

A rotor especially for use in a high speed electric motor/generator comprises fibre-reinforced plastics material incorporating magnetic filler material, the fibre-reinforced plastics material being arranged as a multi-layered cylindrical portion of the rotor, the magnetic filler material being disposed within and between the layers. The said cylindrical portion may be a hollow tubular-portion. The said portion may be enclosed in a non-composite eg, wear resistant, layer.

1 Claim, 2 Drawing Sheets

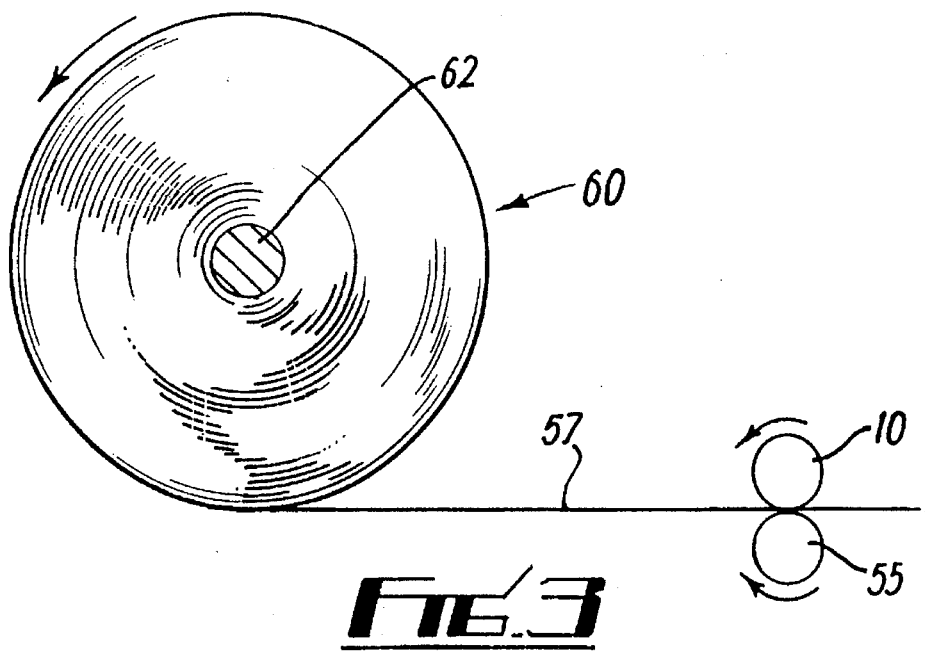
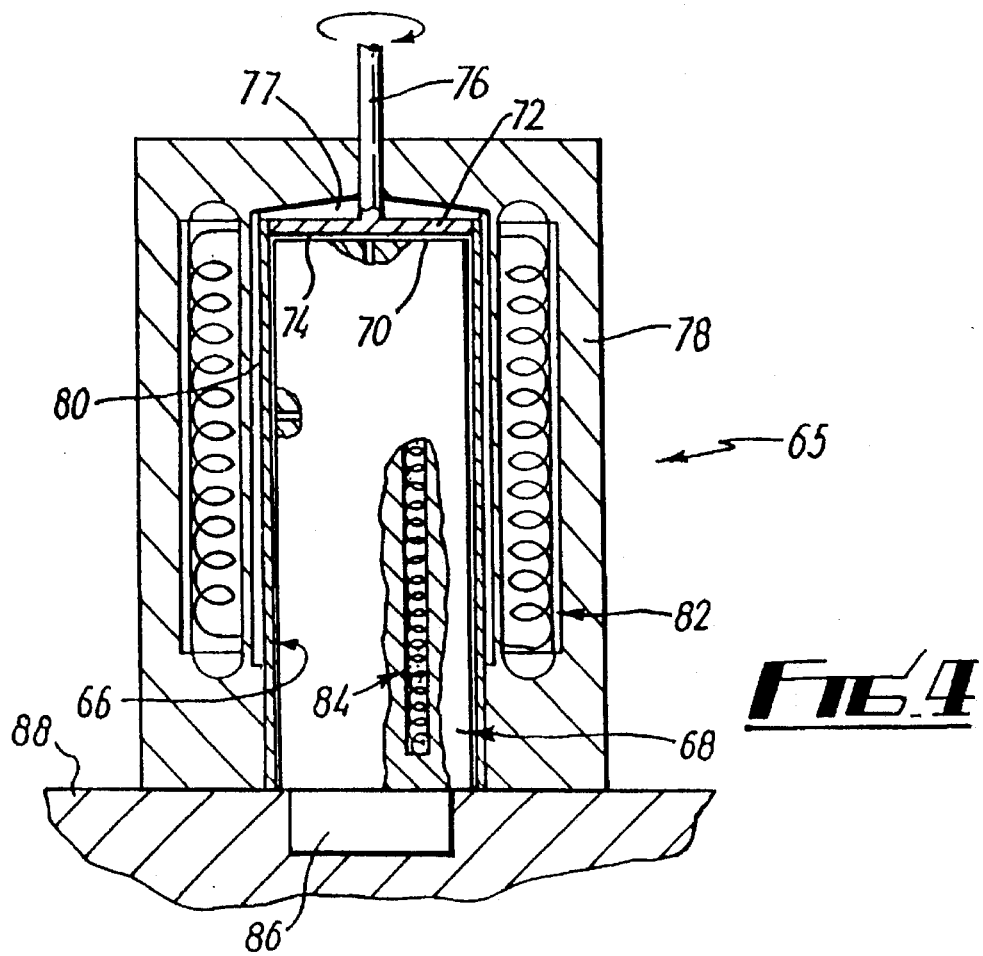

METHOD OF MAKING A ROTOR

This is a divisional of application Ser. No. 08/232,268, filed Jul. 6, 1994, now U.S. Pat. No. 5,477,092.

A ROTOR

This invention relates to a rotor, and more particularly but not exclusively, to a rotor for use in high speed applications.

High speed rotors have been proposed for use in a number of applications particularly as electric motor/generators. They can act as a motor or generator depending on whether electrical energy is being fed into or extracted from an electrical coil on a stator associated with the rotor. Such an arrangement is proposed for example in FR 2614367 as a means of energy storage and conversion.

Prior art rotors for motor/generator applications have constructions which are not ideal for high speed applications.

According to the present invention, there is provided a rotor comprising fibre-reinforced plastics material incorporating magnetic filler material, the fibre-reinforced plastics material being arranged as a multi-layered cylindrical portion of the rotor, the magnetic filler material being disposed within and between the layers. The said cylindrical portion may be a hollow tubular portion. The said portion may be enclosed in a non-composite, eg wear resistant, layer.

Rectors of the present invention beneficially allow an efficient electromagnetic interaction between the rotor and a neighbouring stator to be maintained along the length of the body of the rotor and out of balance regions in the rotating mass can be avoided when the rotor is employed at high speeds.

Preferably, the said portion in the rotor according to the present invention comprises a first layer of windings of fibres, at least one intermediate layer of windings of fibres superimposed thereon and defining helical spaces therebetween, magnetic filler material in the spaces, and an outer layer of windings of fibres superimposed about the intermediate layer(s).

The said portion might be superimposed on a substrate.

The said plastics material may comprise any one or more of the known matrix materials employed in fibre reinforced composite materials. For example the material may comprise a thermosetting or cold setting or thermoplastic polymeric material, eg selected from one or more of epoxy resins, polyester resins, Friedel Crafts resins, polyimides, polyamides, polyether sulphones and polyether ketones (PEEK) optionally together with known hardeners, fillers and the like. The fibres may be wound as a collection in tows. They may be wound helically and/or in hooped fashion within the composite.

The invention also provides a method of manufacturing a rotor, the method including the steps of:

a) winding onto a mandrel an initial layer comprising resin-impregnated fibres;

b) winding at least one intermediate layer comprising resin-impregnated fibres about the initial layer so as to define spaces between the fibres of the intermediate layer;

c) disposing a mixture comprising magnetic filler material and a resin matrix material in the spaces;

d) winding an outer layer comprising resin-impregnated fibres about the intermediate layer;

e) applying a magnetic field to align the magnetic filler material in a required orientation whilst the resin is in the liquid state prior to gelling and during the gelling process;

f) curing the resin, and g) magnetising the magnetic material.

The resin may be a thermosetting resin and curing may be carried out by heating to an appropriate known curing temperature; cooling may follow step f) before step g).

Preferably, the fibres comprise carbon fibres, or may comprise glass fibres, or Kevlar (polyaramid) plastics or aluminium tape, boron, nylon, polyolefin or mixtures of these or any other suitable known fibres.

The magnetic material employed as the said magnetic filler material may comprise particles, spheroids, whiskers, fibres or the like. Desirably, the material is a powder material. The magnetic material may comprise iron, nickel, cobalt or an alloy containing one or more of these. It may comprise a ferrite, eg barium ferrite. Alternatively, and preferably, the material comprises a known hard magnetic material (ie hard to de-magnetise) comprising a rare-earth element, eg cobalt-samarium or neodymium-boron. The magnetic material may suitably be incorporated between tows of fibres within the composite.

It will be understood that the invention also includes a rotor having a portion thereof made by the method of the invention, and an electric motor or an electric generator or a combined motor-generator incorporating the rotor.

Fibre reinforced composites containing magnetic material for rotating components are known in the prior art eg GB 1370655 and U.S. Pat. No. 4,508,567 but these prior art devices are for different essentially low speed applications. The construction and manufacture of the novel rotors of the present invention for high speed electric motor/generators is quite distinct from such prior art devices. The rotors of the present invention can provide accurate position control, high electrical efficiency and ultra-high speed capacity in an electric motor/generator. The use of composites in rotors in the novel manner described herein permits a very high strength construction to be obtained which can withstand high speeds.

Embodiments of the present invention will now be further described by way of example only with reference to the accompanying drawings, in which:

FIG. 3 shows a diagrammatic representation of an application of the rotor and stator of FIGS. 1 and 2, and FIG. 4 shows an application of a modified form of the rotor and stator of FIGS. 1 and 2.

Figure 1:
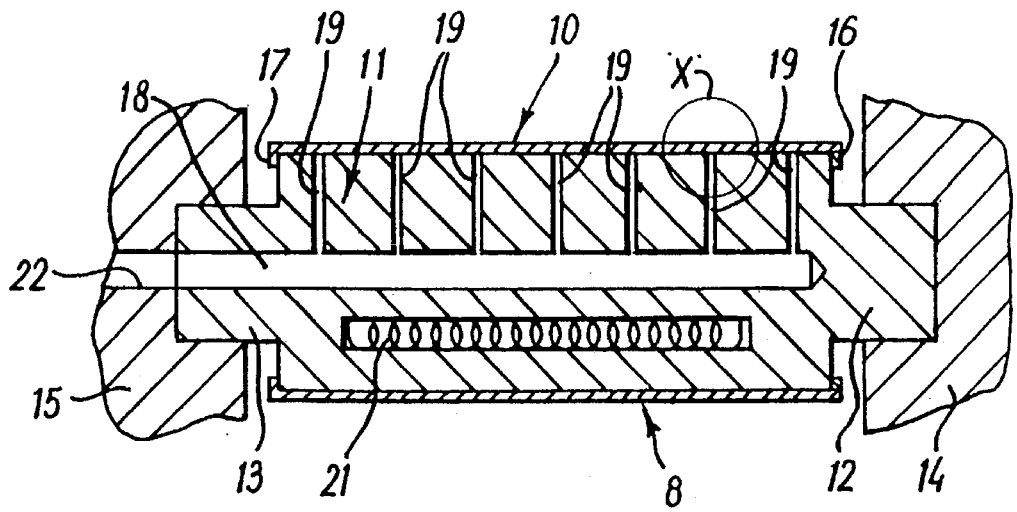
FIG. 1 shows a side sectional representation of a rotor about a stator.

Referring now to FIG. 1, an electric motor 8 is shown comprising a hollow cylindrical rotor 10 about a cylindrical stator 11 of laminated construction and which has end spigots 12, 13 for location in supports 14, 15. End rings 16, 17 at the ends of the rotor 10 hold the rotor 10 captive on the stator 11. A central blind hole 18 in the stator 11 communicates with a number (seven are shown) of radial holes 19 which exit at a narrow air bearing space 20 (not shown in FIG. 1) between the rotor 10 and the stator 11. Electric coils 21 (only one is shown) are disposed in the stator 11 to provide an electric field to drive the rotor 10. A hole 22 in the support 15 communicates with the central hole 18 to provide a feed path for air to the air bearing space 20.

Figure 2:
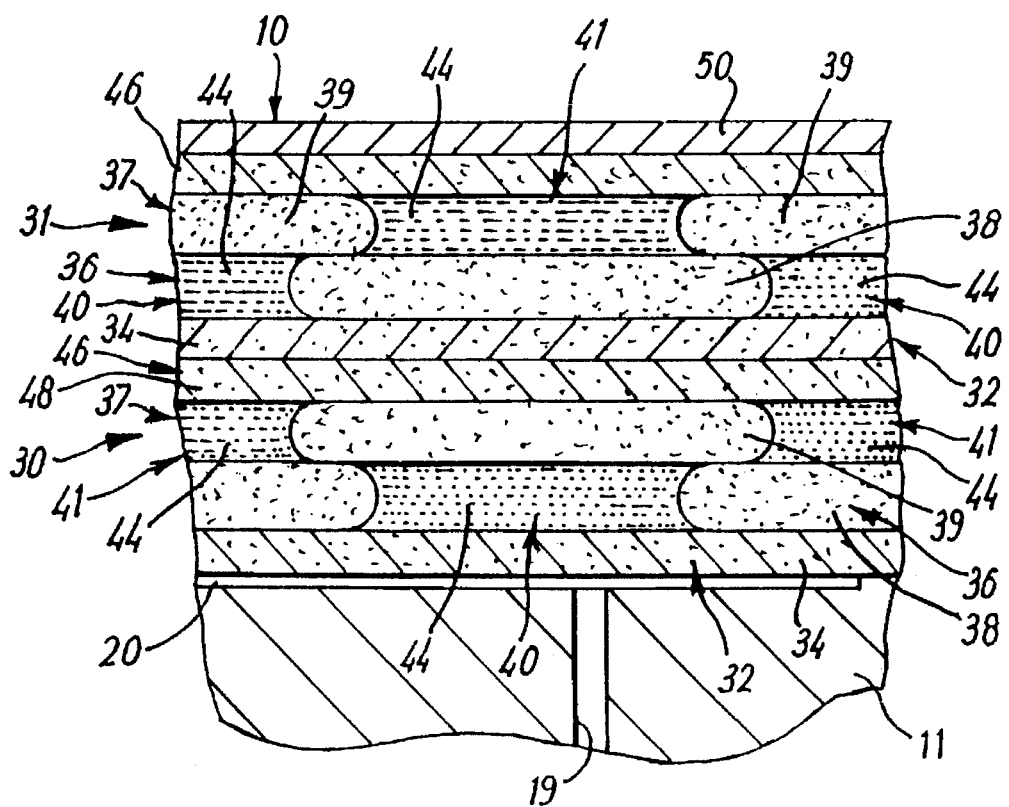
FIG. 2 shows to an enlarged scale that part of the rotor within the area 'X' of FIG. 1.

As shown in more detail in FIG. 2, the rotor 10 comprises an inner shell 30, and an outer shell 31 superimposed on the inner shell 30. Two intermediate layers 36, 37, each comprising tows 38, 39 respectively of carbon fibres in an epoxy resin matrix, are wound circumferentially at the same helix angle but displaced angularly 180° out-of-phase about the layer 32. Spaces 40, 41 respectively between the tows 38, 39 are filled with a composite 44 comprising magnetic material powder held in an epoxy resin matrix. An outer layer 46 comprising tows 48 of carbon fibres in an epoxy resin matrix is wound circumferentially closely together on the intermediate layer 37. A final wear resistant (eg chrome) layer 50 is superimposed on the outer layer 46.

In use of the motor 8, air is fed through the holes 22, 18 and 19 to the air bearing space 20 to support the rotor 10. The coils 21 are energised and the resulting electric field rotates the rotor 10. Because of the light weight of the rotor 10 extremely high rotational speeds can be attained, ie. above 20,000 rpm (eg, 100,000 rpm), although the rotor 10 may be used below these speeds.

In one application of the motor 8 in the printing industry as shown in FIG. 3, the motor 8 (not shown) is disposed opposite and adjacent to an idler roller 55 so as to feed between them paper 57 from a roll 60 supported on an idler bearing 62. The motor 8 allows the tension of the paper 57 to be controlled.

An application of the rotor of the invention as an electric generator is shown in FIG. 4. In FIG. 4, a generator 65 shown has a rotor 66 similar in most respects to the rotor 10 of FIGS. 1 and 2 and disposed about an upright internal stator 68. The internal stator 68 is similar in most respects to the stator 11 of FIG. 1 but has a flat upper end 70 from which an end disc 72 of the rotor 66 is displaced by an air bearing space 74. A shaft 76 from the end disc 72 extends through a gas thrust bearing space 77 for connection to a drive unit (not shown), for example a gas turbine. An external stator 78 about the rotor 66 defines a gas bearing space 80 between them. The external stator 78 has electric coils 82 whilst electric coils 84 are disposed in the internal stator 69. The lower end of the internal stator 68 defines a spigot 86 which locates in a base 88.

In use of the generator 65, rotation of the shaft 76 drives the rotor 66, thereby generating electric current in the coils 82, 84.

A example of suitable magnetic material powder is cobalt samarium but other magnetic material powders may be used.

It will be understood that alternative fibres, for example glass fibres, may be used in the rotor 10, 66. It will also be appreciated that the rotor 10,66 may comprise only one shell or more than two shells, and may be just one or more than two intermediate layers of windings.

One method of forming the rotor 10 will now be described.

Using a conventional fibre winding machine, tows 34 of carbon fibres of the initial layer 32 of the inner shell 30 impregnated with uncured epoxy resin are wound onto a rotating mandrel. The intermediate layers 26, 37 of tows 38, 39 of carbon fibres impregnated with uncured epoxy resin are wound onto the inner layer 32 with a 180° out-of-phase relationship to one another. The spaces 40, 41 between the tows 38,39 are filled with the composite 44 comprising magnetic material powder in a demagnetised state and uncured epoxy resin. The outer layer 46 of tows 48 of carbon fibres impregnated with uncured epoxy resin is wound onto the intermediate layer 37. The outer shell 31 is formed in a similar manner with the exception of the wear resistant layer 50. A magnetic field is applied in a known way so as to align the magnetic material powder in the composite 44. Finally, the epoxy resin is cured in an appropriate heating environment. The outer shell 31 is machined to size, removed from the mandrel, and the end rings 16, 17 attached using a suitable adhesive eg Araldite (Trade Mark). The wear resistant layer 50 is then applied. The rotor 10 so formed is magnetised using a suitable electric coil to convert the magnetic material powder in the composite 44 into its permanent magnetised state.

The rotor 66 is made in a similar manner, except that the end disc 72 is attached to the inside of the rotor 66 using a suitable adhesive (eg Araldite).

An alternative wear resistant layer 50 such as glass fibre reinforced composite, or ceramic material may be used.

Instead of the rotor being of hollow form, the shells 30, 31 may be superimposed on a substrate (eg aluminium) to form a composite rotor.

I claim:

1. A method of manufacturing a rotor comprising fibre-reinforced plastics material incorporating magnetic filler material, the fibre-reinforced plastics material being arranged as a multi-layered cylindrical portion of the rotor, the magnetic filler material being disposed within and between the layers, the method including the steps of:

a) winding onto a mandrel an initial layer comprising resin-impregnated fibres;

b) winding at least one intermediate layer comprising resin-impregnated fibres about the initial layer so as to defined spaces between the fibres of the intermediate layer;

c) disposing a mixture comprising magnetic filler material and a resin matrix material in the spaces;

d) winding an outer layer comprising resin-impregnated fibres about the intermediate layer;

e) applying a magnetic field to align the magnetic filler material in a required orientation whilst the resin is in the liquid state prior to gelling and during the gelling process;

f) curing the resin; and g) magnetising the magnetic material.

* * * * *